May 24, 1927.                W. H. DUNNE                1,629,488
                            HOLDING DEVICE
                         Filed Nov. 14, 1925

Inventor.
W. H. Dunne
By Egerton R. Case
Atty.

Patented May 24, 1927.

1,629,488

UNITED STATES PATENT OFFICE.

WILLIAM HAMILTON DUNNE, OF TORONTO, ONTARIO, CANADA.

HOLDING DEVICE.

Application filed November 14, 1925, Serial No. 69,118, and in Canada September 26, 1925.

My invention relates to improvements in holding devices, and relates more particularly to devices for holding skate blades while the same are being sharpened, and the principal object of my invention is to provide a device for the purpose set forth whereby blades of different thicknesses can be firmly clamped in position and the skate moved so as to give the proper adjustment in position to the blade before the same is sharpened, and in the following specification I shall illustrate and describe a disclosure within my invention, and what I claim as new will be set forth in the claims forming part of this specification.

Figure 1:
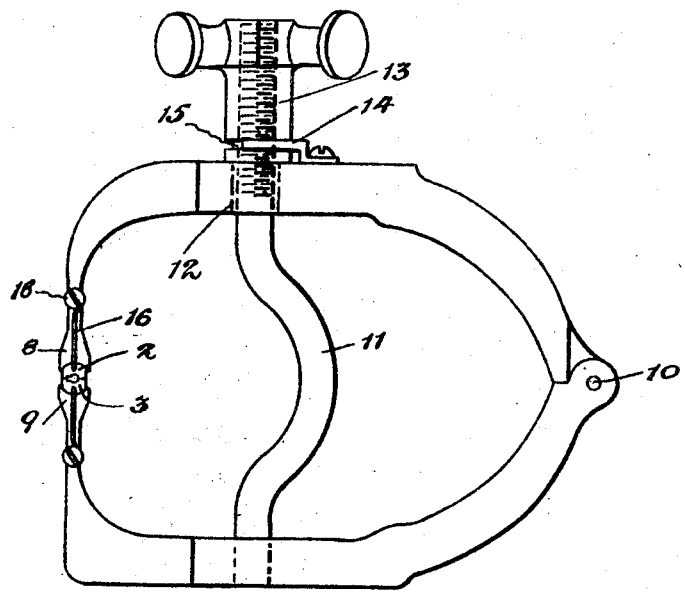
Figure 2:
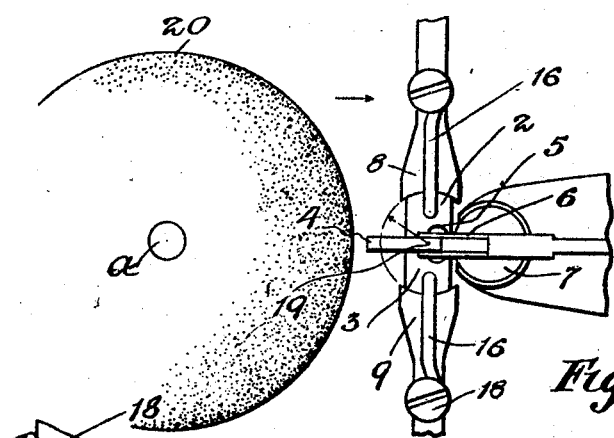
Figure 3:
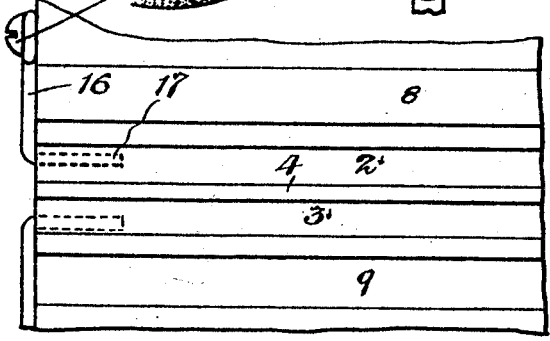

Fig. 1 is an end elevation of my preferred form of device within my invention, showing the jaw members clamped together. Fig. 2 is an end elevation of the jaw members and portions of the clamping members therefor, showing the blade of a skate clamped therebetween, and the proper position of the same in relation to the grinding wheel, and Fig. 3 is an elevation of part of the front side of my device as illustrated.

In the drawings, like characters of reference refer to the same parts.

The invention essentially comprises upper and lower jaw members 2 and 3 the opposing faces of which may have any suitable configuration so as to accommodate the shape of the blade 4 and the parts whereby the same is connected to the upper portion of the skate. In the drawings, the said opposing faces are formed to receive the rivets 5 and the flanges 6 of the tube 7.

The outer faces of the said jaw members are arc-shaped, and co-act with correspondingly-shaped inner surfaces of the upper and lower clamp member 8 and 9.

The said clamp members are hinged together at the rear of the device as shown at 10.

Any suitable means may be employed to move the upper clamp member in respect of the lower clamp member, but the preferred means for this purpose comprises a bent bar 11 located substantially centrally longitudinally of the device and fixedly supported in the bottom of the lower clamp member 9. This bar passes through a slot 12 formed in the top of the upper clamp member 8, and projects thereabove, and is threaded. 13 is a nut having threaded engagement with the said bar, and this nut may be coupled to the top of the upper clamp member 8 by a well-know construction, such as a plate 14 suitably secured to the said upper clamp member, and formed to engage in a slot 15 formed in the lower portion of the nut 13.

By manipulating the nut 13 in the desired direction, the upper clamp member 8 will be moved around the hinge 10 and so open or close the jaw member 2 in respect of the jaw member 3.

The bar 11 is offset as shown so that while the clamping force is reasonably near the jaw members 2 and 3, room will be provided for the boot attached to the skate to be sharpened.

The jaw members 2 and 3 are held in place by keepers preferably in the form of wire rods 16 located in contact with the ends of the clamp members 8 and 9 where the jaw members 2 and 3 are positioned. Each of the said rods is provided with a substantially horizontal portion 17, which portion extends into longitudinal holes formed in the jaw members 2 and 3 from the outer ends thereof. The outer ends of the rods 16 are looped around screws 18 tapped into the said clamp means.

The holes in the said jaw members 2 and 3 are located substantially on a line with the vertical centre of the said jaw members, and consequently the major portion of the rods 16 normally lie in the same position. This construction permits substantially uniform movement of the jaw members 2 and 3, in either direction around the axis 19.

In use, the article to be sharpened or ground, is clamped between the jaw members 2 and 3. The operator should test the correctness of the adjustment of the article 4 by bringing it lightly in contact with the wheel 20, and if the bright mark left by the wheel extends across the article in a uniform width, correct adjustment is had and the operator can proceed to work.

The hinge 10 is preferably located in the same horizontal position as the axis of the jaw members 2 and 3 because these jaw members when closed will be one above the other and so give the maximum support to the work.

Obviously in case of breakage, the jaw members 2 and 3 can be readily removed and replaced.

In practice, the device should be so supported that the axis 19 will be substantially in the same plane as the axis of the shaft $a$.

While I have described what I consider to be the best embodiment within my invention, it must be understood that the principle thereof may be embodied in many different forms, and I desire not to be limited beyond the requirements of the prior art and the terms of my claims.

What I claim as my invention is:

A device of the class described embracing a pair of jaw members the outer faces of which are solely arc-shaped; hinged clamp members the inner surfaces of which are shaped to receive the outer arc-shaped faces of the said jaw members to provide bearings therefor; external vertically-disposed wire rods having each a horizontal portion extending into longitudinal holes opening through each end of each of the said jaws members; means whereby the vertical portions of said wire rods are coupled each to its associated clamp member, and means whereby one of said clamp members is moved around its hinge to permit of the opening and closing of said jaw members.

WILLIAM HAMILTON DUNNE.